(12) United States Patent
Melakari et al.

(10) Patent No.: US 12,153,212 B2
(45) Date of Patent: Nov. 26, 2024

(54) EYEGLASS LENS WITH EYE-TRACKING COMPONENTS

(71) Applicant: Pixieray Oy, Espoo (FI)

(72) Inventors: Klaus Melakari, Espoo (FI); Qing Xu, Espoo (FI); Ville Miettinen, Helsinki (FI); Niko Eiden, Espoo (FI)

(73) Assignee: Pixieray Oy, Espoo (FI)

( * ) Notice: Subject to any disclaimer, the term of this patent is extended or adjusted under 35 U.S.C. 154(b) by 324 days.

(21) Appl. No.: 17/488,404

(22) Filed: Sep. 29, 2021

(65) Prior Publication Data

US 2023/0097774 A1   Mar. 30, 2023

(51) Int. Cl.
  *G02B 27/00*   (2006.01)
  *G02C 7/10*   (2006.01)
  *G02C 11/00*   (2006.01)
  *G02C 13/00*   (2006.01)

(52) U.S. Cl.
  CPC .......... *G02B 27/0093* (2013.01); *G02C 7/10* (2013.01); *G02C 11/10* (2013.01); *G02C 13/00* (2013.01)

(58) Field of Classification Search
  CPC ........ G02B 27/0093; G02B 2027/0178; G02B 2027/0187; G02B 27/0172; G02B 27/00; G02C 7/10; G02C 11/10; G02C 13/00
  See application file for complete search history.

(56) References Cited

U.S. PATENT DOCUMENTS

| | | | |
|---|---|---|---|
| 6,299,308 B1 | 10/2001 | Voronka et al. | |
| RE39,539 E | 4/2007 | Torch | |
| 2014/0098226 A1* | 4/2014 | Pletcher | H04N 7/18 382/103 |
| 2015/0378161 A1* | 12/2015 | Bailey | G02B 26/10 359/214.1 |
| 2016/0302663 A1* | 10/2016 | Fayolle | G02B 5/1866 |
| 2018/0074322 A1* | 3/2018 | Rousseau | G02B 27/0977 |
| 2018/0131850 A1* | 5/2018 | Gustafsson | G06F 3/013 |
| 2018/0260024 A1* | 9/2018 | Maltz | G02B 27/017 |
| 2019/0250707 A1* | 8/2019 | Kondo | G02B 27/0093 |
| 2019/0369417 A1* | 12/2019 | Kniess | G02B 13/16 |

(Continued)

FOREIGN PATENT DOCUMENTS

| | | |
|---|---|---|
| FR | 3079936 A1 | 10/2019 |
| JP | 2019139743 A | 8/2019 |

OTHER PUBLICATIONS

European Patent Office, Notification of Transmittal of the International Search Report and the Written Opinion of the International Searching Authority, or the Declaration; Application No. PCT/FI2022/050574 mailed Feb. 3, 2023; 13 pages.

*Primary Examiner* — Balram T Parbadia
*Assistant Examiner* — Gabriel A Sanz
(74) *Attorney, Agent, or Firm* — Ziegler IP Law Group LLP (57) ABSTRACT

An eye-tracking apparatus. At least one light source and a plurality of sensors are arranged at a periphery of a first surface of at least one lens. A frame is employed to hold the at least one lens. A processor coupled to the at least one light source and the plurality of sensors is configured to control the at least one light source to emit light towards the user's eye, control the plurality of sensors to sense reflections of the light off a surface of the user's eye, and process sensor data pertaining to the sensed reflections to determine a gaze direction of the user's eye.

22 Claims, 6 Drawing Sheets

(56) References Cited

U.S. PATENT DOCUMENTS

2020/0355929 A1\* 11/2020 Zhang .................. G02B 27/425
2020/0413028 A1\* 12/2020 Tsau .................... G02B 27/017
2021/0031051 A1\* 2/2021 Kubota .................. G02C 7/04

\* cited by examiner

EYEGLASS LENS WITH EYE-TRACKING COMPONENTS

TECHNICAL FIELD

The present disclosure relates to eye-tracking apparatuses. Moreover, the present disclosure relates to methods of manufacturing an eye-tracking apparatus. Furthermore, the present disclosure also relates to methods of preparing a lens for use in an eye-tracking apparatus.

BACKGROUND

Eye tracking is increasingly being used in diverse fields, for example, such as academic and research, medical research, military, human-computer interaction, gaming industry, aviation, automation and the like. With such a wide range of application areas, there is a need for eye trackers that are light and compact, and that provide accurate eye-tracking. In this regard, wearable devices have become a popular platform onto which eye trackers can be mounted.

However, there are various design challenges. Incorporating an eye-tracking functionality in wearable devices tends to make the wearable devices bulky with an unwieldy form factor. Incorporating eye-tracking components (including light sources and cameras) into a wearable device may partially obstruct a user's vision, thereby negatively impacting usability and safety. Moreover, multiple components make the setup complex and difficult to manufacture, whilst also negatively impacting the aesthetics of such wearable devices.

Conventionally, eye-tracking components have been integrated into eyeglass frames. Thus, eyeglass frame manufacturers need to take into consideration how to include the eye-tracking components into eyeglass frames. Such an integration requires a detailed manufacturing know-how and limits the number of choices available to the manufacturers related to materials and manufacturing processes using which such eyeglass frames can be made.

Moreover, the eyeglass frame industry is a fashion and design driven industry that utilises a vast subcontractor network to make a wide variety of shapes and forms from many different kinds of materials using different technologies. Thus, a specific requirement of integrating eye-tracking components into a frame limits the number of choices available to the user.

Furthermore, conventionally, cameras have been used for eye-tracking purposes. However, data processing involved with camera images has a high power consumption. This challenge is possible to be solved to some extent in purpose-built devices like extended-reality (XR) headsets and smart glasses, which include other custom-designed processing elements and displays apart from cameras.

Therefore, in light of the foregoing discussion, there exists a need to overcome the aforementioned challenges associated with incorporating eye tracking in wearable devices.

SUMMARY

The present disclosure seeks to provide an eye-tracking apparatus. Moreover, the present disclosure seeks to provide a method for manufacturing an eye-tracking apparatus. Furthermore, the present disclosure also seeks to provide a method for preparing a lens for use in an eye-tracking apparatus. Furthermore, the present disclosure also seeks to provide a solution to the existing problems of eye-tracking in wearable devices.

In a first aspect, an embodiment of the present disclosure provides an eye-tracking apparatus comprising:
- at least one lens per eye, wherein a first surface of the at least one lens is to face a user's eye when the eye-tracking apparatus is worn by the user;
- a frame employed to hold the at least one lens;
- at least one light source arranged along a periphery of the first surface of the at least one lens;
- a plurality of sensors arranged along the periphery of the first surface of the at least one lens; and
- a processor coupled to the at least one light source and the plurality of sensors, the processor being configured to:
  - control the at least one light source to emit light towards the user's eye;
  - control the plurality of sensors to sense reflections of the light off a surface of the user's eye; and
  - process sensor data pertaining to the sensed reflections to determine a gaze direction of the user's eye.

In a second aspect, an embodiment of the present disclosure provides a method for manufacturing an eye-tracking apparatus, the method comprising:
- cutting a lens to fit a shape of a frame;
- arranging at least one light source along a periphery of a first surface of the lens, wherein the first surface of the lens is to face a user's eye when the eye-tracking apparatus is worn by the user;
- arranging a plurality of sensors along the periphery of the first surface of the lens;
- providing connections to the at least one light source and to the plurality of sensors along the periphery of the first surface;
- fitting the lens to the frame;
- coupling the at least one light source and the plurality of sensors to a processor using the connections; and
- configuring the processor to:
  - control the at least one light source to emit light towards the user's eye;
  - control the plurality of sensors to sense reflections of the light off a surface of the user's eye; and
  - process sensor data pertaining to the sensed reflections to determine a gaze direction of the user's eye.

In a third aspect, an embodiment of the present disclosure provides a method for preparing a lens for use in an eye-tracking apparatus, the method comprising:
- cutting the lens to fit a shape of a frame of the eye-tracking apparatus;
- arranging at least one light source along a periphery of a first surface of the lens;
- arranging a plurality of sensors along the periphery of the first surface of the lens; and
- providing connections to the at least one light source and to the plurality of sensors along the periphery of the first surface.

Embodiments of the present disclosure substantially eliminate, or at least partially address the aforementioned problems in the prior art, by providing an eye-tracking apparatus that can be easily, reliably and efficiently integrated into an existing wearable device, without having any tangible effect on an overall size and form factor of the wearable device, whilst facilitating an unobtrusive visibility to the user and ensuring that an aesthetic value of the wearable device is maintained.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an eye-tracking apparatus comprising:

- at least one lens per eye, wherein a first surface of the at least one lens is to face a user's eye when the eye-tracking apparatus is worn by the user;
- a frame employed to hold the at least one lens;
- at least one light source arranged along a periphery of the first surface of the at least one lens;
- a plurality of sensors arranged along the periphery of the first surface of the at least one lens; and
- a processor coupled to the at least one light source and the plurality of sensors, the processor being configured to:
  - control the at least one light source to emit light towards the user's eye;
  - control the plurality of sensors to sense reflections of the light off a surface of the user's eye; and
  - process sensor data pertaining to the sensed reflections to determine a gaze direction of the user's eye.

In a second aspect, an embodiment of the present disclosure provides a method for manufacturing an eye-tracking apparatus, the method comprising:

- cutting a lens to fit a shape of a frame;
- arranging at least one light source along a periphery of a first surface of the lens, wherein the first surface of the lens is to face a user's eye when the eye-tracking apparatus is worn by the user;
- arranging a plurality of sensors along the periphery of the first surface of the lens;
- providing connections to the at least one light source and to the plurality of sensors along the periphery of the first surface;
- fitting the lens to the frame;
- coupling the at least one light source and the plurality of sensors to a processor using the connections; and
- configuring the processor to:
  - control the at least one light source to emit light towards the user's eye;
  - control the plurality of sensors to sense reflections of the light off a surface of the user's eye; and
  - process sensor data pertaining to the sensed reflections to determine a gaze direction of the user's eye.

In a third aspect, an embodiment of the present disclosure provides a method for preparing a lens for use in an eye-tracking apparatus, the method comprising:

- cutting the lens to fit a shape of a frame of the eye-tracking apparatus;
- arranging at least one light source along a periphery of a first surface of the lens;
- arranging a plurality of sensors along the periphery of the first surface of the lens; and
- providing connections to the at least one light source and to the plurality of sensors along the periphery of the first surface.

Pursuant to embodiments of the present disclosure, the eye-tracking apparatus can be beneficially implemented on an existing wearable device in a simple, reliable and efficient manner. Such an implementation of the eye-tracking apparatus into an existing wearable device has a negligible additional effect on an overall size and form factor of the wearable device. Moreover, as the at least one light source and the plurality of sensors can be retrofitted onto any wearable device (for example, such as eyeglasses or sunglasses), the eye-tracking apparatus can be worn like a regular eyeglass or sunglass. Arrangement of the at least one light source and the plurality of sensors at the periphery facilitates an unobtrusive visibility to the user, whilst ensuring that an aesthetic value of the wearable device is maintained. Furthermore, the eye-tracking apparatus is lightweight and has a compact form factor. Moreover, the eye-tracking apparatus is capable of providing an accurate eye-tracking at minimal power consumption.

Throughout the present disclosure, the term "wearable device" refers to an item worn over eyes of a user. Such a wearable device may be worn for various purposes, for example, such as fashion or adornment, protection against the environment, or presentation of an extended-reality scene to the user. Examples of such a wearable device include, but are not limited to, a pair of glasses, a pair of sunglasses, smart glasses, and a head-mounted display.

Optionally, the at least one lens has an optical power prescribed for the user's eye. This enables customisation of the eye-tracking apparatus according to the user's eyesight. It will be appreciated that the optical power may not be as exactly prescribed for the user's eye, but may be selected to conform with the user's need.

Moreover, optionally, the at least one lens is a sunglass lens. Such an implementation enables the user to use the eye-tracking apparatus with ease in an outdoor environment, whilst also being aesthetically pleasing.

The lens can be made of any one of: glass, a polycarbonate, a plastic, a high-index plastic. The lens may have at least one of: an anti-reflective coating, an anti-scratch coating, a photochromic coating, a UV-blocking coating, a polarized coating.

Pursuant to embodiments of the present disclosure, the lens serves as a base onto which the at least one light source and the plurality of sensors (hereinafter collectively referred to as "eye-tracking components", for the sake of convenience only) are arranged directly. As mentioned earlier, the lens is cut to fit the shape of the frame prior to arranging the eye-tracking components at the periphery of the first surface of the lens.

Throughout the present disclosure, the term "periphery" refers to an area in a proximity of an edge of the first surface. In some implementations, this area could be on the first surface itself. In other implementations, this area could be perpendicular to the first surface. Optionally, a width of this area lies in a range of 0.01 millimetre to 5 millimetres. For example, the width of this area may be from 0.01, 0.05, 0.1, 0.25, 0.5 or 1 millimetre up to 0.1, 0.5, 1, 2.5 or 5 millimetres.

Optionally, in the eye-tracking apparatus, the at least one light source and the plurality of sensors are arranged along the periphery of the first surface using a flexible printed circuit board, wherein the flexible printed circuit board provides connections to the at least one light source and to the plurality of sensors. The flexible printed circuit board can be formed by screen printing of conductive tracks using functional inks on a thin sheet of a flexible material. Examples of such a flexible material include, but are not limited to, a polyimide (for example, such as Kapton® and Cirlex®), a polyester, and a polycarbonate. The flexible printed circuit board is beneficially formed to adapt to a shape of the periphery. The technical benefit of using the flexible printed circuit board is that it eliminates a need for connectors or cables, reduces a cost and time of manufacture, and provides reliable electrical connections and communication, whilst ensuring an optimal use of an available space at the periphery.

Alternatively, optionally, in the eye-tracking apparatus, the at least one light source and the plurality of sensors are arranged along the periphery of the first surface using an electrically-conductive adhesive, wherein the connections to the at least one light source and to the plurality of sensors are provided by wires printed on the periphery of the first surface. Examples of such an electrically-conductive adhesive include, but are not limited to, silver conductive epoxy adhesive, nickel conductive epoxy adhesive, and electrically-conductive silicone adhesive. The technical benefit of using the electrically-conductive adhesive is that its characteristics (such as a curing temperature) can be matched to a specific material of the lens, and it offers improved fatigue resistance.

It will be appreciated that the connections could be implemented in various different ways. As an example, the connections could be implemented as a bundle of individual wires. As another example, the connections could be implemented as aligned, anisotropic nano wires of a metal or a metal alloy. Some examples of highly conductive metals are silver, gold, copper and aluminium. As yet another example, the connections could be implemented as transparent electrode layers. Such transparent electrode layers may, for example, be made of indium tin oxide (ITO) or doped zinc oxide (ZnO), where ZnO is doped with aluminium or hydrogen.

It will be appreciated that such connections provide electrical power to the eye-tracking components (namely, the at least one light source and the plurality of sensors) for operation as well as facilitate communication between the processor and the eye-tracking components. Such connections are beneficially provided without having to compromise an aesthetic design of the wearable device. For this purpose, a power source that provides the electrical power as well as the processor may be installed at any suitable location on the frame of the eye-tracking apparatus. As an example, the power source can be located at an end of a temple of the frame. As another example, the processor can be located at a bridge of the frame.

Optionally, the eye-tracking apparatus further comprises a wireless communication interface, which enables the processor to send the sensor data or information pertaining to the gaze direction of the user's eye to an external device.

Optionally, the sensor data is in a form of an image that is representative of features of the user's eye. Such features may comprise at least one of: a shape of a pupil of the user's eye, a size of the pupil, corneal reflections of the at least one light source from the surface of the user's eye, a relative position of the pupil with respect to the corneal reflections, a relative position of the pupil with respect to corners of the user's eye. Optionally, when processing the sensor data, the processor is configured to:

process the image to determine the features of the user's eye; and determine, based on the features of the user's eye, the gaze direction of the user's eye.

Moreover, optionally, in the eye-tracking apparatus, the light emitted by the at least one light source is infrared light. In other words, the at least one light source and the plurality of sensors optionally operate on infrared light and can be implemented as at least one infrared light source and a plurality of infrared sensors. The infrared light being invisible to the user's eye is not detectable by the user, and thus, is suitable for eye-tracking purposes.

Alternatively, optionally, the light emitted by the at least one light source is ultraviolet light. In such a case, the at least one light source and the plurality of sensors optionally operate on ultraviolet light and can be implemented as at least one ultraviolet light source and a plurality of ultraviolet sensors. In this regard, ultraviolet light in a range of wavelengths that is not harmful to the human eye is selected. For example, a wavelength of the selected ultraviolet light may lie in a range of 315 nm to 400 nm.

It will be appreciated that yet alternatively, the light emitted by the at least one light source can be visible light, which lies in a visible part of the spectrum.

The present disclosure also relates to the method of the second aspect and the method of the third aspect as described above. Various embodiments and variants disclosed above, with respect to the aforementioned first aspect, apply mutatis mutandis to both the methods.

Optionally, in the method, the at least one light source and the plurality of sensors are arranged along the periphery of the first surface using a flexible printed circuit board, wherein the flexible printed circuit board provides the connections.

Optionally, in the method, the at least one light source and the plurality of sensors are arranged along the periphery of the first surface using an electrically-conductive adhesive, wherein the connections are provided by printing wires on the periphery of the first surface.

Optionally, in the method, the light emitted by the at least one light source is infrared light. Alternatively, optionally, the light emitted by the at least one light source is ultraviolet light.

Optionally, in the method, the lens has an optical power prescribed for the user's eye. Optionally, in the method, the lens is a sunglass lens.

Moreover, the eye-tracking components are arranged at the periphery of the first surface of the lens by using a multi-step process in which a first step involves holding the lens in a pre-fabricated holder and a second step involves using one or more of the following techniques.

According to an embodiment, the method further comprises:
  machining the first surface of the lens to create a plurality of recesses, wherein the at least one light source and the plurality of sensors are arranged inside the plurality of recesses; and
  filling the plurality of recesses with a material having a same refractive index as the lens, upon arranging the at least one light source and the plurality of sensors.

The first surface of the lens could be machined using Computer Numerical Control (CNC) milling to create the plurality of recesses. In such a case, computerized controls are employed to rotate a multi-point cutting tool to progressively remove material from the lens. This enables in producing a custom-designed recess for arranging the eye-tracking components.

Optionally, prior to filling the plurality of recesses, the connections are drawn from the at least one light source and the plurality of sensors. Optionally, the connections are also embedded along with the eye-tracking components.

The plurality of recesses could be filled using any one of: casting, overmoulding, insert moulding, dispensing, ink jetting. It will be appreciated that overmoulding and insert moulding are typically used in a case where the eye-tracking components are durable and can withstand thermal expansion.

Optionally, the material that can be used to fill the plurality of recesses comprises at least one polymer. Examples of the at least one polymer include, but are not limited to, polymethyl methacrylate, styrene-co-acrylonitrile copolymer, polyamide, thermoplastic polyimide, polyethylene, polypropylene, polyolefin, polycarbonate, polyethylene terephthalate, polybutylene terephthalate, polyether, polyether-ether-ketone, polyether-imide, thermoplastic resin, and epoxy resin.

According to another embodiment, the steps of arranging the at least one light source and the plurality of sensors are performed by casting the at least one light source and the plurality of sensors into the lens along the periphery of the first surface, respectively. In this regard, lens casting technology is employed to embed the at least one light source and the plurality of sensors into the lens. The at least one lens and the plurality of sensors are attached to an inner wall of a mould cavity prior to casting, so as to align them with the periphery of the first surface of the lens upon manufacture. Subsequently, a liquid material is introduced in the mould cavity and allowed to solidify. It will be appreciated that in ophthalmic industry, it is more common to use casting as a manufacturing method. Casting is typically performed using low viscosity monomers, for example, such as a thermosetting plastic. As casting does not involve heating, the thermal stress in the material is low and the residue tension is small. This leads to a higher quality as compared to injection moulding.

According to yet another embodiment, the steps of arranging the at least one light source and the plurality of sensors are performed by using any one of: injection moulding, laminating.

In injection moulding, a molten material is injected under high pressure into a mould and then allowed to cool down. The material can be made of a thermoplastic.

In laminating, the at least one light source and the plurality of sensors are placed along with the connections (at the periphery of the first surface of the lens) between the lens and a perforated lamination film that has openings for the eye-tracking components. Heat is then applied to seal the lamination film to the lens.

According to still another embodiment, the steps of arranging the at least one light source and the plurality of sensors are performed by printing the at least one light source and the plurality of sensors along the periphery of the first surface of the lens, respectively. Such printing may be performed using three-dimensional (3D) printing of the lens. This enables the eye-tracking components and the connections to be directly embedded in the mechanical structure of the lens.

DETAILED DESCRIPTION OF THE DRAWINGS

Figure 1:
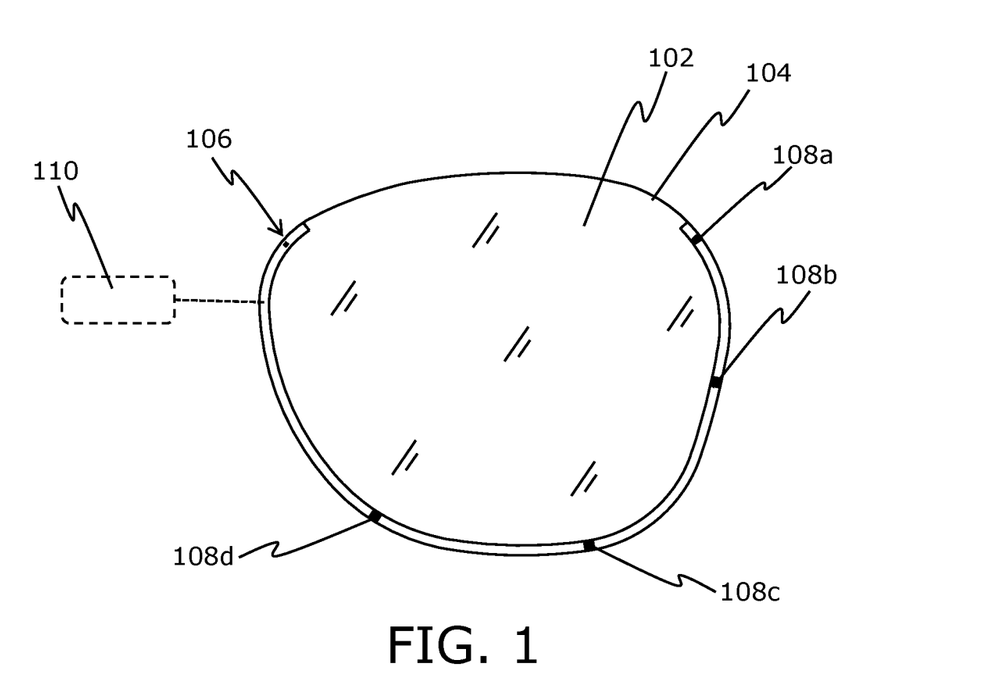
FIG. 1 depicts a lens prepared for use in an eye-tracking apparatus, in accordance with an embodiment of the present disclosure.

Referring to FIG. 1, illustrated is a lens 102 prepared for use in an eye-tracking apparatus, in accordance with an embodiment of the present disclosure. Along a periphery 104 of a first surface of the lens 102, there are arranged at least one light source, depicted as a light source 106, and a plurality of sensors, depicted as sensors 108a, 108b, 108c and 108d. The light source 106 and the sensors 108a-d are coupled to a processor 110.

Figure 2:
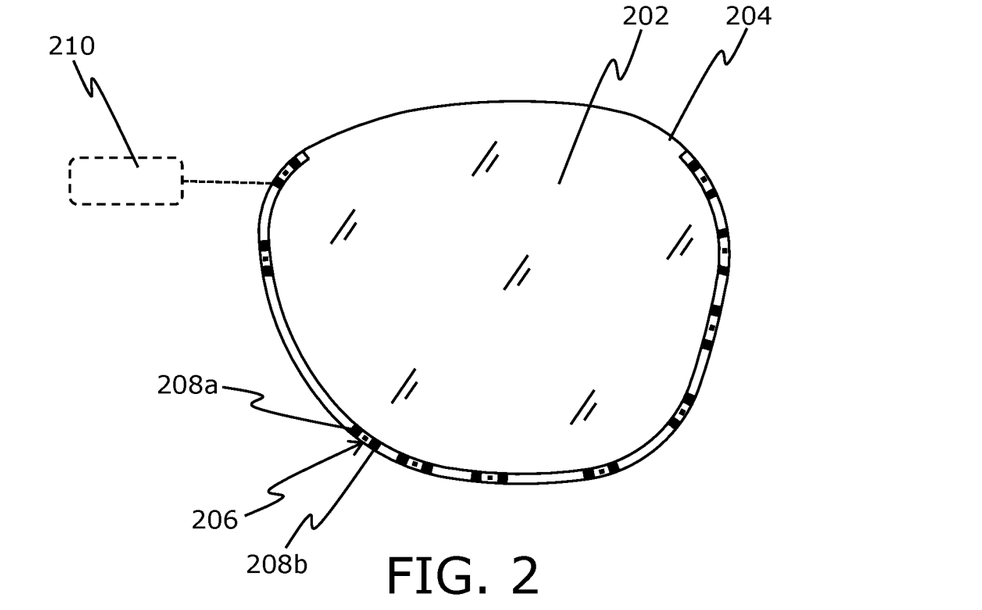
FIG. 2 depicts another lens prepared for use in an eye-tracking apparatus, in accordance with an embodiment of the present disclosure.

Referring to FIG. 2, illustrated is another lens 202 prepared for use in an eye-tracking apparatus, in accordance with an embodiment of the present disclosure. Along a periphery 204 of a first surface of the lens 202, there are arranged:
  at least one light source (for the sake of convenience, one out of 10 light sources is referenced as 206); and
  a plurality of sensors (for the sake of convenience, two out of 20 sensors are referenced as 208a and 208b.

The at least one light source and the plurality of sensors are coupled to a processor 210.

FIGS. 1 and 2 are merely examples, which should not unduly limit the scope of the claims herein. It is to be understood that the specific implementations of the lenses 102 and 202 are provided as examples and are not to be construed as limiting them to specific numbers, types, or arrangements of light sources and sensors. A person skilled in the art will recognize many variations, alternatives, and modifications of embodiments of the present disclosure.

Figure 3:
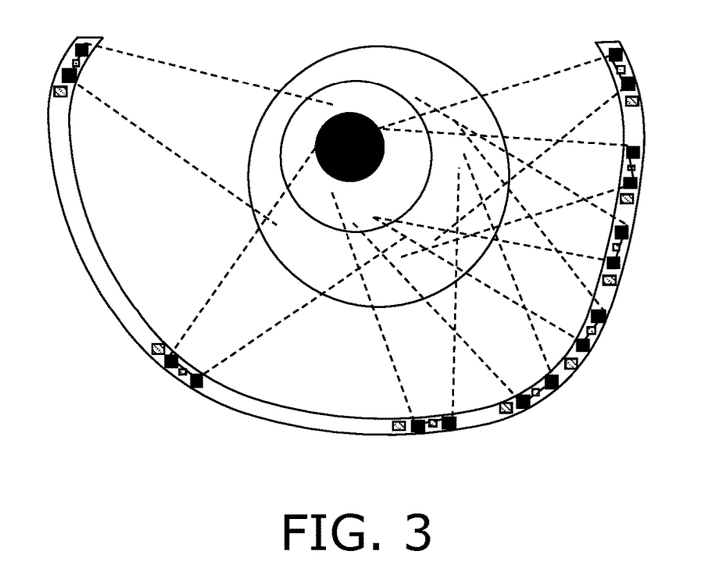
FIG. 3 is a schematic view of a portion of an eye-tracking apparatus in operation, in accordance with an embodiment of the present disclosure.

Referring to FIG. 3, illustrated is a schematic view of a portion of an eye-tracking apparatus in operation, in accordance with an embodiment of the present disclosure. Said portion of the eye-tracking apparatus shows a lens with at least one light source and a plurality of sensors. Dotted lines depict a field of view of individual sensors.

FIG. 3 is merely an example, which should not unduly limit the scope of the claims herein. A person skilled in the art will recognize many variations, alternatives, and modifications of embodiments of the present disclosure.

Figure 4:
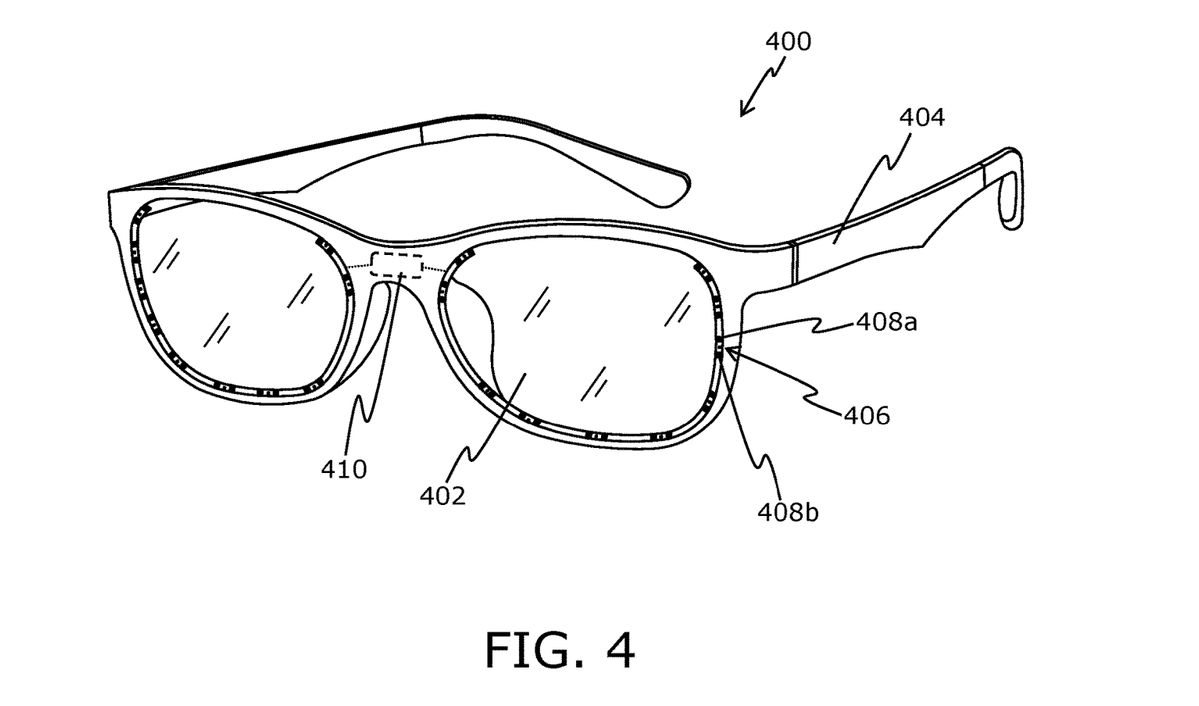
FIG. 4 depicts an eye-tracking apparatus, in accordance with an embodiment of the present disclosure.

Referring to FIG. 4, illustrated is an eye-tracking apparatus 400, in accordance with an embodiment of the present disclosure. The eye-tracking apparatus 400 comprises:
- at least one lens per eye (for the sake of convenience, one out of two lenses is referenced as 402);
- a frame 404 employed to hold the at least one lens;
- at least one light source arranged along a periphery of the first surface of the at least one lens (for the sake of convenience, one out of 10 light sources is referenced as 406);
- a plurality of sensors arranged along the periphery of the first surface of the at least one lens (for the sake of convenience, two out of 20 sensors are referenced as 408a and 408b); and
- a processor 410 coupled to the at least one light source and the plurality of sensors.

Figure 5:
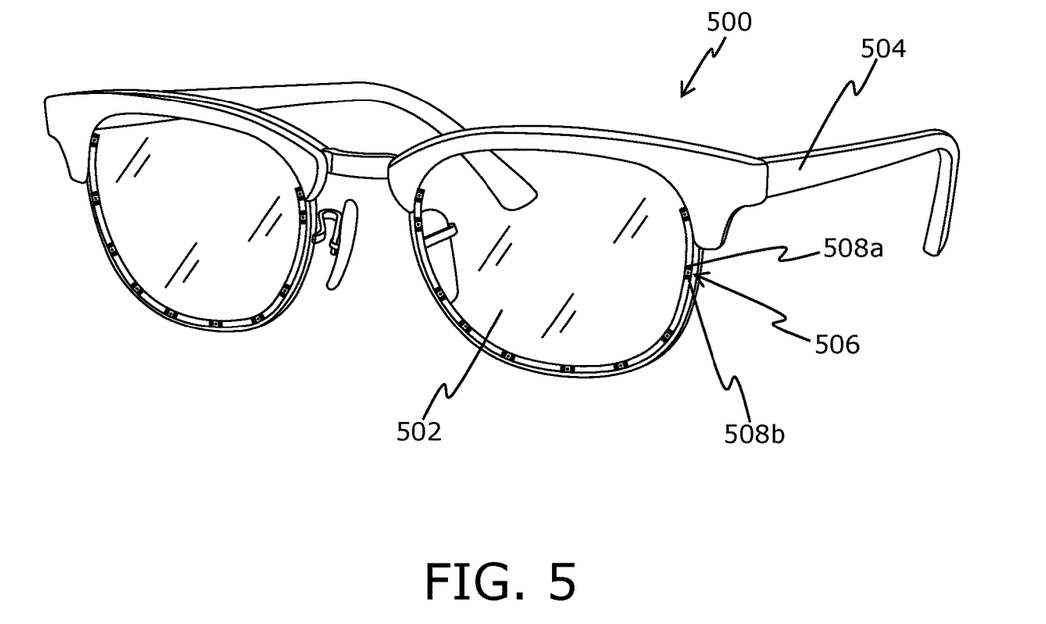
FIG. 5 depicts another eye-tracking apparatus, in accordance with an embodiment of the present disclosure.

Referring to FIG. 5, illustrated is another eye-tracking apparatus 500, in accordance with an embodiment of the present disclosure. The eye-tracking apparatus 500 comprises:
- at least one lens per eye (for the sake of convenience, one out of two lenses is referenced as 502);
- a frame 504 employed to hold the at least one lens;
- at least one light source arranged along a periphery of the first surface of the at least one lens (for the sake of convenience, one out of 10 light sources is referenced as 506);
- a plurality of sensors arranged along the periphery of the first surface of the at least one lens (for the sake of convenience, two out of 20 sensors are referenced as 508a and 508b); and
- a processor (not shown in the figure) coupled to the at least one light source and the plurality of sensors.

Figure 6:
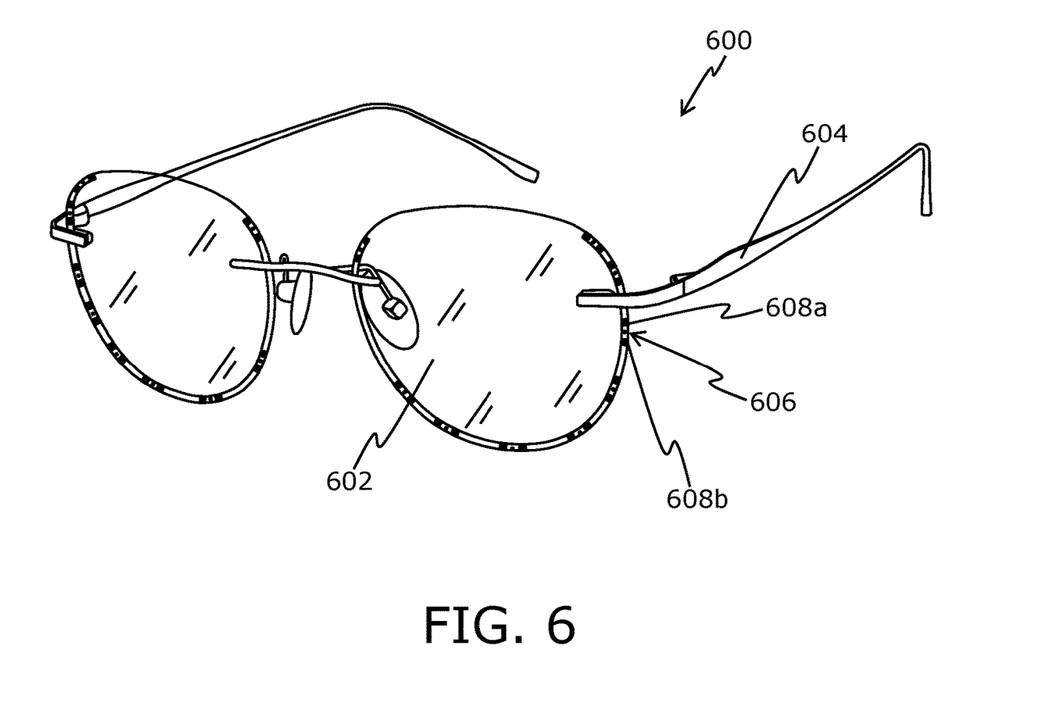
FIG. 6 depicts yet another eye-tracking apparatus, in accordance with an embodiment of the present disclosure.

Referring to FIG. 6, illustrated is yet another eye-tracking apparatus 600, in accordance with an embodiment of the present disclosure. The eye-tracking apparatus 600 comprises:
- at least one lens per eye (for the sake of convenience, one out of two lenses is referenced as 602);
- a frame 604 employed to hold the at least one lens;
- at least one light source arranged along a periphery of the first surface of the at least one lens (for the sake of convenience, one out of nine light sources is referenced as 606);
- a plurality of sensors arranged along the periphery of the first surface of the at least one lens (for the sake of convenience, two out of 18 sensors are referenced as 608a and 608b); and
- a processor (not shown in the figure) coupled to the at least one light source and the plurality of sensors.

Figure 7:
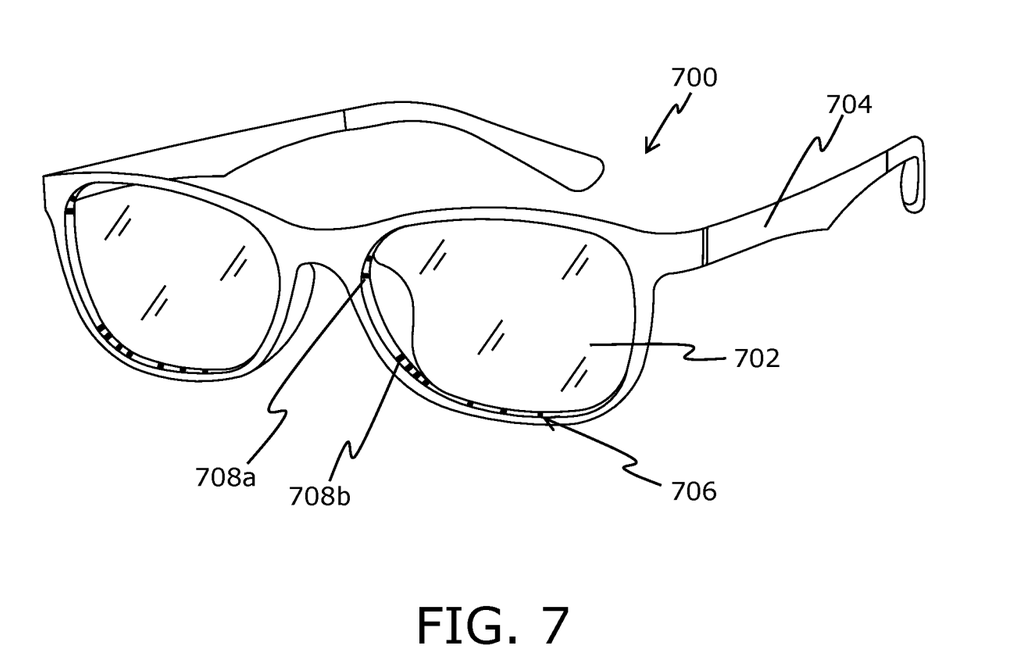
FIG. 7 depicts still another eye-tracking apparatus, in accordance with an embodiment of the present disclosure.

Referring to FIG. 7, illustrated is still another eye-tracking apparatus 700, in accordance with an embodiment of the present disclosure. The eye-tracking apparatus 700 comprises:
- at least one lens per eye (for the sake of convenience, only one lens is referenced as 702);
- a frame 704 employed to hold the at least one lens;
- at least one light source arranged along a periphery of the first surface of the at least one lens (for the sake of convenience, only one light source is referenced as 706);
- a plurality of sensors arranged along the periphery of the first surface of the at least one lens (for the sake of convenience, only two sensors are referenced as 708a and 708b); and
- a processor (not shown in the figure) coupled to the at least one light source and the plurality of sensors.

Figure 8:
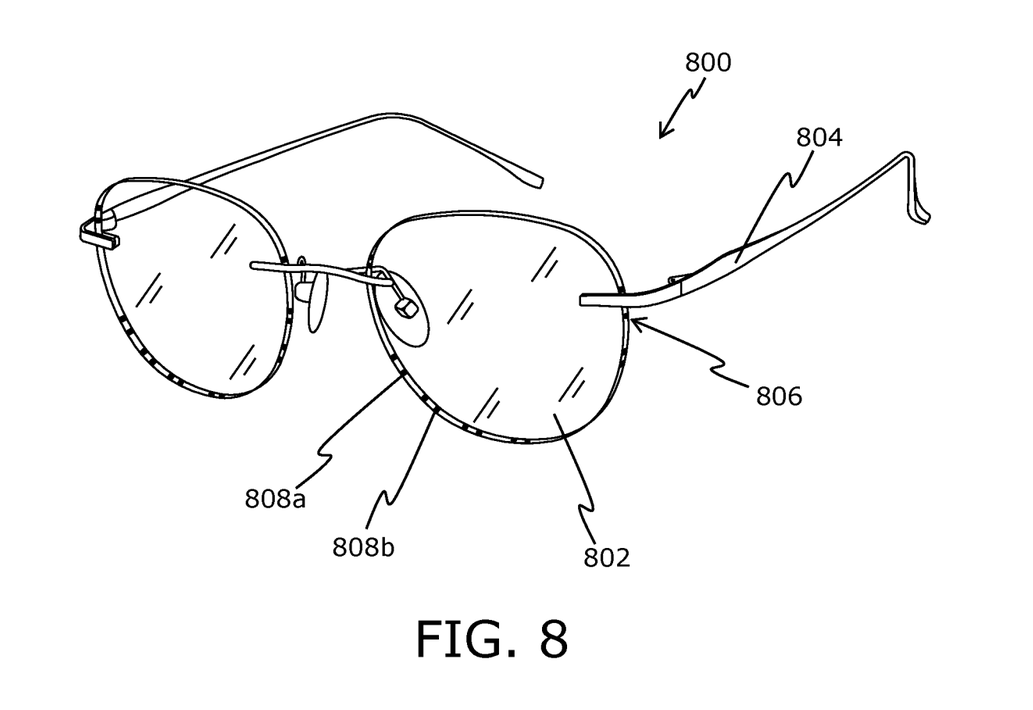
FIG. 8 depicts yet another eye-tracking apparatus, in accordance with an embodiment of the present disclosure.

Referring to FIG. 8, illustrated is yet another eye-tracking apparatus 800, in accordance with an embodiment of the present disclosure. The eye-tracking apparatus 800 comprises:
- at least one lens per eye (for the sake of convenience, only one lens is referenced as 802);
- a frame 804 employed to hold the at least one lens;
- at least one light source arranged along a periphery of the first surface of the at least one lens (for the sake of convenience, only one light source is referenced as 806);
- a plurality of sensors arranged along the periphery of the first surface of the at least one lens (for the sake of convenience, only two sensors are referenced as 808a and 808b); and
- a processor (not shown in the figure) coupled to the at least one light source and the plurality of sensors.

FIGS. 4-8 are merely examples, which should not unduly limit the scope of the claims herein. As mentioned earlier, the periphery of the first surface is an area that is in a proximity of an edge of the first surface. In FIGS. 4, 5 and 6, this area is on the first surface itself, whereas in FIGS. 7 and 8, this area is perpendicular to the first surface. Moreover, in FIGS. 4-8, the frame 404, the frame 504, the frame 604, the frame 704 and the frame 804 have been shown as a full-rim frame, a half-rim frame, a rimless frame, another full-rim frame and another rimless frame, respectively. It is to be understood that the specific implementations of the eye-tracking apparatuses 400, 500, 600, 700 and 800 are provided as examples and are not to be construed as limiting them to specific numbers, types, or arrangements of light sources and sensors. A person skilled in the art will recognize many variations, alternatives, and modifications of embodiments of the present disclosure.

Figure 9A:
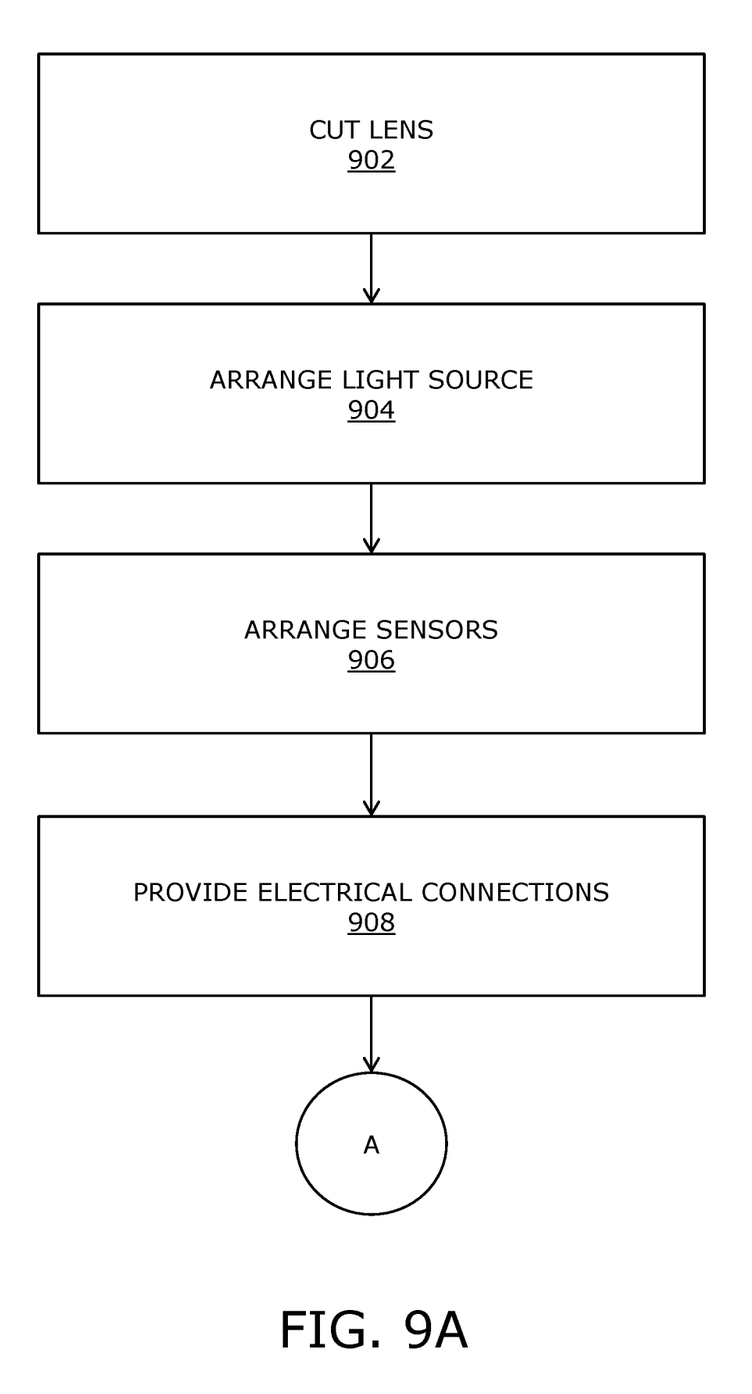
FIGS. 9A and 9B depict steps of a method for manufacturing an eye-tracking apparatus, in accordance with an embodiment of the present disclosure.
Figure 9B:
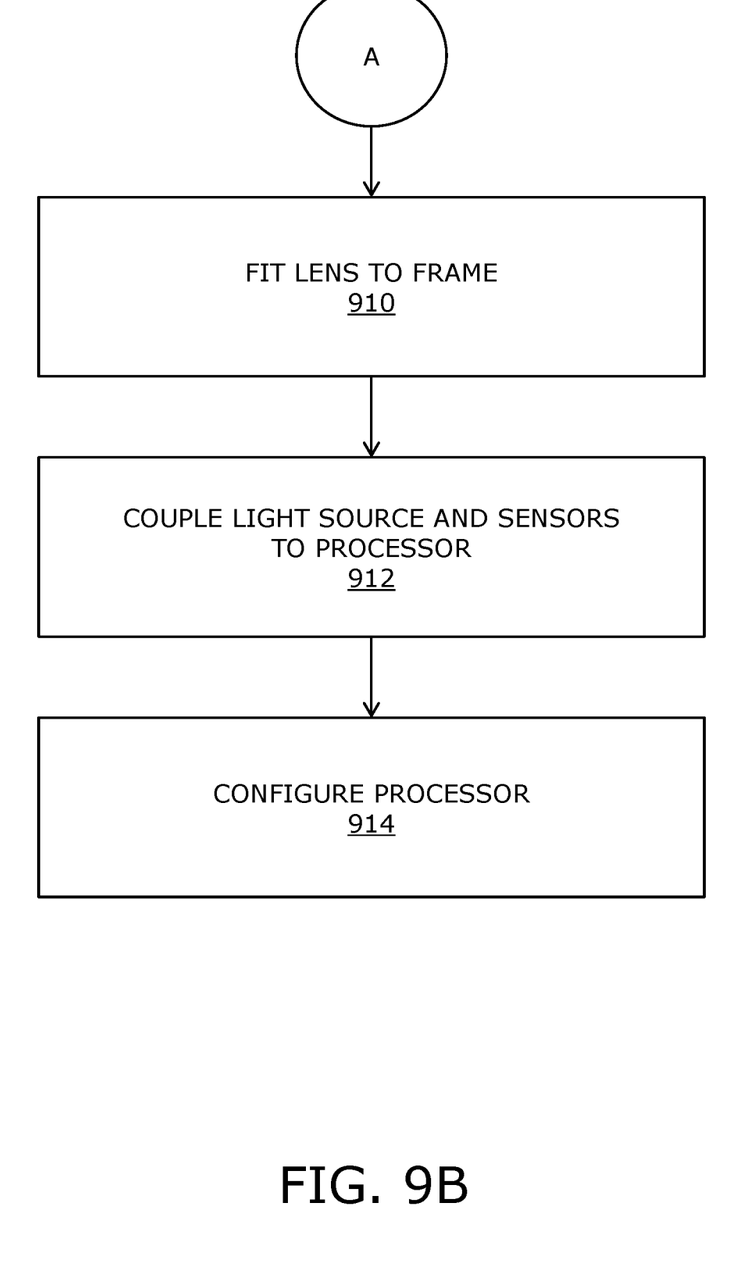

Referring to FIGS. 9A and 9B, illustrated are steps of a method for manufacturing an eye-tracking apparatus, in accordance with an embodiment of the present disclosure. At a step 902, a lens is cut to fit a shape of a frame. At a step 904, at least one light source is arranged along a periphery of a first surface of the lens, wherein the first surface of the lens is to face a user's eye when the eye-tracking apparatus is worn by the user. At a step 906, a plurality of sensors are arranged along the periphery of the first surface of the lens. At a step 908, connections to the at least one light source and to the plurality of sensors are provided along the periphery of the first surface. At a step 910, the lens is fitted to the frame. At a step 912, the at least one light source and plurality of sensors are coupled to a processor using the connections. At a step 914, the processor is configured to:
- control the at least one light source to emit light towards the user's eye;
- control the plurality of sensors to sense reflections of the light off a surface of the user's eye; and process sensor data pertaining to the sensed reflections to determine a gaze direction of the user's eye.

The aforementioned steps are only illustrative and other alternatives can also be provided where one or more steps are added, one or more steps are removed, or one or more steps are provided in a different sequence without departing from the scope of the claims herein. For example, the steps 904 and 906 may be performed simultaneously.

Moreover, the steps 902, 904, 906 and 908 can also be considered to represent steps of a method for preparing a lens for use in an eye-tracking apparatus, in accordance with an embodiment of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

What is claimed is:

1. An eye-tracking apparatus comprising:
   at least one lens, wherein a first surface of the at least one lens is configured to face a user's eye when the eye-tracking apparatus is worn by the user;
   a frame configured to hold the at least one lens;
   at least one light source arranged directly on the lens, the at least one light source arranged along a periphery of the first surface of the at least one lens, the periphery being proximate to an outer edge of the first surface and having a width in a range of 0.01 millimeters to 5 millimeters;
   a plurality of sensors arranged directly on the lens, the plurality of sensor arranged along the periphery of the first surface of the at least one lens, wherein one sensor is disposed adjacent to one side of the at least one light source and another sensor is disposed adjacent to an other opposing side of the at least one light source; wherein the at least one light source and the plurality of sensors are arranged along the periphery of the first surface of the lens using an electrically-conductive adhesive and electrical connections to the at least one light source and to the plurality of sensors are provided by a flexible printed circuit board, the flexible printed circuit board formed by screen printing of conductive tracks using functional inks on a thin sheet of flexible material printed on the periphery of the first surface, the flexible circuit board being shaped to conform to a shape of the periphery; and
   a processor coupled to the at least one light source and the plurality of sensors, the processor being configured to:
   control the at least one light source to emit light towards the user's eye;
   control the plurality of sensors to sense reflections of the light off a surface of the user's eye; and
   process sensor data pertaining to the sensed reflections to determine a gaze direction of the user's eye.

2. The eye-tracking apparatus of claim 1, wherein the at least one light source and the plurality of sensors are arranged along the periphery of the first surface using a flexible printed circuit board, wherein the flexible printed circuit board has a shape and a width of the periphery of the lens and provides connections to the at least one light source and to the plurality of sensors.

3. The eye-tracking apparatus of claim 1, wherein the light emitted by the at least one light source is infrared light.

4. The eye-tracking apparatus of claim 1, wherein the at least one lens has an optical power prescribed for the user's eye.

5. The eye-tracking apparatus of claim 1, wherein the at least one lens is a sunglass lens.

6. A method for manufacturing an eye-tracking apparatus, the method comprising:
   cutting a lens to fit a shape of a frame;
   arranging at least one light source directly on the lens along a periphery of a first surface of the lens, wherein the first surface of the lens is configured to face a user's eye when the eye-tracking apparatus is worn by the user, the periphery being proximate to an outer edge of the first surface and having a width in a range of 0.01 millimeters to 5 millimeters;
   arranging a plurality of sensors directly on the lens along the periphery of the first surface of the lens, wherein one sensor is disposed adjacent to one side of the at least one light source an another sensor is disposed adjacent to an other opposing side of the at least one light source;; wherein the at least one light source and the plurality of sensors are arranged along the periphery of the first surface of the lens using an electrically-conductive adhesive and electrical connections to the at least one light source and to the plurality of sensors are provided by a flexible printed circuit board, the flexible printed circuit board formed by screen printing of conductive tracks using functional inks on a thin sheet of flexible material printed on the periphery of the first surface, the flexible circuit board being shaped to conform to a shape of the periphery;
   providing connections to the at least one light source and to the plurality of sensors along the periphery of the first surface;
   fitting the lens to the frame;
   coupling the at least one light source and the plurality of sensors to a processor using the connections; and
   configuring the processor to:
   control the at least one light source to emit light towards the user's eye;
   control the plurality of sensors to sense reflections of the light off a surface of the user's eye; and
   process sensor data pertaining to the sensed reflections to determine a gaze direction of the user's eye.

7. The eye-tracking apparatus according to claim 1, wherein the at least one light source and the at least one sensor are arranged directly on the lens by embedding the at least one light source and the at least one senor into the at least one lens.

8. The method of claim 6, further comprising:
   machining the first surface of the lens to create a plurality of recesses along the periphery, wherein the at least one light source and the plurality of sensors are arranged inside the plurality of recesses; and
   filling the plurality of recesses with a material having a same refractive index as the lens, upon arranging the at least one light source and the plurality of sensors.

9. The method of claim 6, wherein the steps of arranging the at least one light source and the plurality of sensors are performed by casting the at least one light source and the plurality of sensors into the lens along the periphery of the first surface, respectively.

10. The method of claim 6, wherein the steps of arranging the at least one light source and the plurality of sensors are performed by printing the at least one light source and the plurality of sensors along the periphery of the first surface of the lens, respectively.

11. The method of claim 6, wherein the steps of arranging the at least one light source and the plurality of sensors are performed by using any one of: injection moulding, laminating.

12. The method of claim 6, wherein the light emitted by the at least one light source is infrared light.

13. The method of claim 6, wherein the lens has an optical power prescribed for the user's eye.

14. The method of claim 6, wherein the lens is a sunglass lens.

15. A method for preparing a lens for use in an eye-tracking apparatus, the method comprising:
cutting the lens to fit a shape of a frame of the eye-tracking apparatus;
arranging at least one light source directly on the lens along a periphery of a first surface of the lens, the periphery being proximate to an outer edge of the first surface and having a width in a range of 0.01 millimeters to 5 millimeters;
arranging a plurality of sensors directly on the lens along the periphery of the first surface of the lens, wherein one sensor is disposed adjacent to one side of the at least one light source an another sensor is disposed adjacent to an other opposing side of the at least one light source; wherein the at least one light source and the plurality of sensors are arranged along the periphery of the first surface of the lens using an electrically-conductive adhesive and electrical connections to the at least one light source and to the plurality of sensors are provided by a flexible printed circuit board, the flexible printed circuit board formed by screen printing of conductive tracks using functional inks on a thin sheet of flexible material printed on the periphery of the first surface, the flexible circuit board being shaped to conform to a shape of the periphery; and
providing connections to the at least one light source and to the plurality of sensors along the periphery of the first surface.

16. The method of claim 15, further comprising:
machining the first surface of the lens to create a plurality of recesses along the periphery, wherein the at least one light source and the plurality of sensors are arranged inside the plurality of recesses; and
filling the plurality of recesses with a material having a same refractive index as the lens, upon arranging the at least one light source and the plurality of sensors.

17. The method of claim 15, wherein the steps of arranging the at least one light source and the plurality of sensors are performed by casting the at least one light source and the plurality of sensors into the lens along the periphery of the first surface, respectively.

18. The method of claim 15, wherein the steps of arranging the at least one light source and the plurality of sensors are performed by printing the at least one light source and the plurality of sensors along the periphery of the first surface of the lens, respectively.

19. The method of claim 15, wherein the steps of arranging the at least one light source and the plurality of sensors are performed by using any one of: injection moulding, laminating.

20. The method of claim 15, wherein the light emitted by the at least one light source is infrared light.

21. The method of claim 15, wherein the lens has an optical power prescribed for the user's eye.

22. The method of claim 15, wherein the lens is a sunglass lens.

* * * * *